US012789104B2

(12) United States Patent
Deuel et al.

(10) Patent No.: US 12,789,104 B2
(45) **Date of Patent: *Nov. 10, 2026**

(54) VEHICLE ENTERTAINMENT SYSTEM AND METHOD

(71) Applicant: DISNEY ENTERPRISES, INC., Burbank, CA (US)

(72) Inventors: Matthew Deuel, Playa Vista, CA (US); Steven M. Chapman, Newbury Park, CA (US); Joseph Mohos, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 18/827,978

(22) Filed: Sep. 9, 2024

(65) Prior Publication Data

US 2024/0424419 A1 Dec. 26, 2024

Related U.S. Application Data

(63) Continuation of application No. 17/702,960, filed on Mar. 24, 2022, now Pat. No. 12,109,504.

(51) Int. Cl.
*A63G 25/00* (2006.01)
*B60K 35/22* (2024.01)
(Continued)

(52) U.S. Cl.
CPC .............. *A63G 25/00* (2013.01); *B60K 35/22* (2024.01); *B60K 35/28* (2024.01); *B60K 35/60* (2024.01);
(Continued)

(58) Field of Classification Search
CPC ........ A63G 25/00; B60K 35/22; B60K 35/28; B60K 35/60; B60K 35/23;
(Continued)

(56) References Cited

U.S. PATENT DOCUMENTS 6,220,965 B1 * 4/2001 Hanna ...................... A63G 7/00 463/52
6,735,435 B2 5/2004 Newell et al.
(Continued)

FOREIGN PATENT DOCUMENTS

WO 2008153524 A1 12/2008

OTHER PUBLICATIONS

Alt et al., "Enabling Micro-Entertainment in Vehicles Based on Context Information", Nov. 12, 2010, pp. 117-124.
(Continued)

*Primary Examiner* — Abdalla A Khaled
(74) *Attorney, Agent, or Firm* — Dorsey & Whitney LLP

(57) ABSTRACT

An entertainment system for a vehicle is disclosed. In one embodiment, the entertainment system includes a guide system to receive and guide an on-road vehicle along an entertainment track, wherein the on-road vehicle is guided autonomously; at least one processor configured to identify a make and model of the on-road vehicle, the at least one processor coupled to a communication system positioned before an entrance of the guide system; and a content output system in communication with the guide system and the at least one processor configured to generate content based on characteristics of the on-road vehicle, wherein the characteristics of the on-road vehicle are determined based on the identified make and model of the on-road vehicle, and wherein the generated content is presented to one or more occupants of the on-road vehicle.

28 Claims, 6 Drawing Sheets

(51) Int. Cl.

| | |
|---|---|
| ***B60K 35/28*** | (2024.01) |
| ***B60K 35/60*** | (2024.01) |
| ***B60L 53/35*** | (2019.01) |
| ***B60W 10/02*** | (2006.01) |
| ***B60W 10/18*** | (2012.01) |
| ***B60W 10/20*** | (2006.01) |
| ***B60W 10/30*** | (2006.01) |
| ***B60W 30/14*** | (2006.01) |
| ***B60W 30/18*** | (2012.01) |
| ***G06F 3/14*** | (2006.01) |
| *B60K 35/23* | (2024.01) |

(52) U.S. Cl.

CPC ............. *B60L 53/35* (2019.02); *B60W 10/02* (2013.01); *B60W 10/18* (2013.01); *B60W 10/20* (2013.01); *B60W 10/30* (2013.01); *B60W 30/14* (2013.01); *B60W 30/18009* (2013.01); *G06F 3/14* (2013.01); *B60K 35/23* (2024.01); *B60W 2556/45* (2020.02)

(58) Field of Classification Search

CPC ........ B60K 2360/164; B60K 2360/165; B60K 2360/175; B60K 2360/33; B60K 2360/797; B60L 53/35; B60L 2250/16; B60L 2260/32; B60W 10/02; B60W 10/18; B60W 10/20; B60W 10/30; B60W 30/14; B60W 30/18009; B60W 2556/45; G06F 3/14; G09G 2380/10

See application file for complete search history.

(56) References Cited

U.S. PATENT DOCUMENTS

| | | | | |
|---|---|---|---|---|
| 7,739,006 | B2 | 6/2010 | Gillula | |
| 7,741,978 | B2 | 6/2010 | Becker | |
| 7,756,602 | B2 | 7/2010 | Koempel et al. | |
| 7,905,790 | B2 | 3/2011 | Schnuckle | |
| 8,025,581 | B2 | 9/2011 | Bryan et al. | |
| 8,179,337 | B2 | 5/2012 | Wilzbach et al. | |
| 8,585,476 | B2 | 11/2013 | Mullen | |
| 8,795,095 | B2 | 8/2014 | Stoker | |
| 8,941,690 | B2 | 1/2015 | Seder et al. | |
| 8,947,253 | B2 | 2/2015 | Bloom et al. | |
| 8,948,541 | B2 | 2/2015 | Neville et al. | |
| 9,042,824 | B2 | 5/2015 | Prasad et al. | |
| 9,043,056 | B2 | 5/2015 | Nemeth et al. | |
| 9,055,022 | B2 | 6/2015 | Ricci | |
| 9,101,824 | B2 | 8/2015 | Cash | |
| 9,155,971 | B1 * | 10/2015 | Trowbridge | A63G 31/16 |
| 9,251,603 | B1 | 2/2016 | Kozko | |
| 9,610,510 | B2 | 4/2017 | Comploi | |
| 9,937,932 | B2 | 4/2018 | Nemeth et al. | |
| 10,015,537 | B2 * | 7/2018 | Li | G06F 16/5866 |
| 10,369,483 | B1 * | 8/2019 | Hall | A63G 31/02 |
| 10,532,814 | B2 | 1/2020 | Chapman et al. | |
| 10,561,954 | B1 | 2/2020 | Kalama et al. | |
| 10,585,471 | B2 | 3/2020 | Reichow et al. | |
| 10,589,625 | B1 | 3/2020 | Goslin | |
| 10,659,772 | B1 | 5/2020 | Hager et al. | |
| 10,668,391 | B1 | 6/2020 | Krauthamer et al. | |
| 10,695,682 | B1 | 6/2020 | Trowbridge et al. | |
| 10,785,621 | B1 | 9/2020 | Drake et al. | |
| 10,807,490 | B2 | 10/2020 | Drake et al. | |
| 10,841,632 | B2 | 11/2020 | Chao et al. | |
| 10,918,961 | B1 | 2/2021 | Kalama et al. | |
| 10,969,748 | B1 | 4/2021 | Goslin | |
| 10,970,560 | B2 | 4/2021 | Khalfan et al. | |
| 10,997,781 | B1 | 5/2021 | Kalama et al. | |
| 11,004,426 | B2 | 5/2021 | Bronder et al. | |
| 11,054,656 | B2 | 7/2021 | Haseltine et al. | |
| 11,112,266 | B2 | 9/2021 | Eatedali et al. | |
| 11,321,923 | B2 | 5/2022 | Rober et al. | |
| 11,640,812 | B2 | 5/2023 | Bronder et al. | |
| 12,109,504 | B2 | 10/2024 | Deuel et al. | |
| 12,491,765 | B2 * | 12/2025 | Deuel | B60K 35/00 |
| 2010/0062866 | A1 * | 3/2010 | Schnuckle | A63G 31/16 472/78 |
| 2013/0083061 | A1 | 4/2013 | Mishra et al. | |
| 2013/0274024 | A1 * | 10/2013 | Geylik | A63G 31/16 472/60 |
| 2014/0142948 | A1 | 5/2014 | Rathi et al. | |
| 2014/0247348 | A1 | 9/2014 | Moore et al. | |
| 2015/0190726 | A1 | 7/2015 | Frolov | |
| 2015/0269780 | A1 | 9/2015 | Herman et al. | |
| 2016/0045833 | A1 | 2/2016 | Boyle | |
| 2016/0327399 | A1 | 11/2016 | Ronnang et al. | |
| 2017/0095742 | A1 * | 4/2017 | Boyle | A63G 7/00 |
| 2018/0120862 | A1 | 5/2018 | Dembinski et al. | |
| 2018/0290561 | A1 | 10/2018 | Baumgärtner | |
| 2018/0342001 | A1 | 11/2018 | Chavarria | |
| 2019/0091587 | A1 * | 3/2019 | Freedman | A63G 21/18 |
| 2019/0224579 | A1 * | 7/2019 | Hall | A63G 31/02 |
| 2020/0031248 | A1 * | 1/2020 | Kwak | B60L 53/16 |
| 2020/0151768 | A1 | 5/2020 | Dekeyser et al. | |
| 2020/0223360 | A1 * | 7/2020 | Bruno | B62D 15/029 |
| 2021/0023457 | A1 | 1/2021 | Kalama et al. | |
| 2021/0204057 | A1 | 7/2021 | Ludwig et al. | |
| 2023/0267896 | A1 | 8/2023 | Bronder et al. | |
| 2025/0041741 | A1 * | 2/2025 | Ward | A63G 31/16 |

OTHER PUBLICATIONS

Edelstein, Stephen, "Apple investigates augmented reality windshield" located at https://www.motorauthority.com/news/1140733_apple-investigates-augmented-reality-windshield, Sep. 9, 2023, 4 pages.

Holoride, "Turning vehicles into moving theme parks", obtained at url: https://www.holoride.com on Oct. 13, 2021, 8 pages.

Lebre et al., "VANET Applications: Hot Use Cases", Jul. 31, 2014, 36 pages.

Tonguz et al., "Multiplayer Games Over Vehicular Ad Hoc Networks: a New Application", Mar. 8, 2010, 19 pages.

U.S. Appl. No. 17/876,199, filed Jul. 28, 2022, entitled "Systems and Methods to Adjust In-Vehicle Content Based on Digital Assets"; 33 pages.

"Adding Thrill to Every Ride", https://maiarlaunchpad.com/holoride_Litepaper_V2.1_Nov21.pdf.

* cited by examiner

VEHICLE ENTERTAINMENT SYSTEM AND METHOD

CROSS REFERENCE TO RELATED APPLICATION

The present application is a continuation of U.S. patent application Ser. No. 17/702,960 filed on Mar. 24, 2022 and titled "Vehicle Entertainment System and Method" which is incorporated by reference herein for all purposes.

FIELD

The present application relates to entertainment systems providing entertainment experiences to occupants of on-road vehicles.

BACKGROUND

Traditional amusement rides and entertainment systems may utilize custom created ride vehicles, which are often expensive and limit the location of such systems. Meanwhile, on-road vehicles continue to include more sophisticated control systems which may be used to provide content, such as movies, music, and the like, to occupants of the vehicle. Further, consumers increasingly spend time in cars receiving goods or services, such as curbside pickup, drive through services (e.g., restaurants and banking), car rental centers, and the like. This time is usually wasted by consumers.

BRIEF SUMMARY

An entertainment system for a vehicle is disclosed. In one embodiment, the entertainment system includes an at least partially enclosed structure configured to receive an on-road vehicle, where the structure defines a path along which the on-road vehicle is configured to move autonomously; a content output system configured to generate content based on one or more characteristics of the on-road vehicle; and a guide system configured to guide the on-road vehicle along the path.

Optionally, in some embodiments, the entertainment system further includes a display received in the structure and visible to an occupant of the on-road vehicle, where the content output system is configured to provide an exterior rendered portion of the content to the display, where the display is configured to present the exterior rendered portion of the content.

Optionally, in some embodiments, the presentation of the exterior rendered portion of the content is synchronized with the movement of the on-road vehicle along the path.

Optionally, in some embodiments, the display is configured to move in synchronization with the on-road vehicle along the path.

Optionally, in some embodiments, the entertainment system further includes a communication system in electrical communication with a control system of the on-road vehicle, where the communication system is configured to receive a first command from the guide system and to transmit the first command to the control system of the on-road vehicle, and based on the first command, the control system is configured to cause the movement of the on-road vehicle along the path.

Optionally, in some embodiments, the communication system is configured to receive a second command from the content output system and to transmit an interior rendered portion of the content to the control system, and based on the second command, the control system is configured to present the interior rendered portion of the content inside of the on-road vehicle.

Optionally, in some embodiments, the content comprises an exterior rendered portion of the content configured to be displayed at an exterior of the on-road vehicle and an interior portion of the content configured to be displayed at an interior of the vehicle, where the interior portion of the content is configured to be displayed in synchronization with the exterior rendered portion of the content.

Optionally, in some embodiments, the communication system is configured to transmit path information to the control system to enable the control system to move the on-road vehicle along the path.

Optionally, in some embodiments, the guide system includes a conveyor that moves the on-road vehicle along the path.

Optionally, in some embodiments, the entertainment system further includes a track coupled to an interior of the structure along the path, where the display is configured to move along the track.

Optionally, in some embodiments, the display includes a projector assembly and a drive portion, where the drive portion is configured to move the display along the track.

Optionally, in some embodiments, the projector assembly includes a plurality of projectors, where the plurality of projectors each display a portion of the content.

Optionally, in some embodiments, the display includes a screen portion and a drive portion, where the drive portion is configured to self drive along the path.

Optionally, in some embodiments, the control system controls at least one of an audio system, a vehicle light, a heads-up display, a windshield wiper control, a powertrain, an operator control, a braking system, a steering system, a window control, a mirror control, a moonroof control, an accelerator control, a shifter, a vehicle climate control system, a vehicle display, a vehicle infotainment system, a door actuator, a trunk actuator, a seat heater, a seat cooler, a seat massage device, a seat positioner, or a clutch.

Optionally, in some embodiments, at least a portion of the content is selected using a mobile device within the on-road vehicle.

Optionally, in some embodiments, the entertainment system further includes a vehicle charging element configured to move with the on-road vehicle along the path while charging the on-road vehicle.

A method is disclosed. In one embodiment, the method includes detecting an on-road vehicle at an entertainment system, where the entertainment system includes an at least partially enclosed structure configured to receive the on-road vehicle, where the structure defines a path along which the on-road vehicle is configured to move autonomously; generating content based on one or more characteristics of the on-road vehicle; guiding the on-road vehicle along the path; and displaying the generated content as the on-road vehicle moves along the path.

Optionally, in some embodiments, displaying the generated content includes providing an exterior rendered portion of the content to a display, where the display is received within the structure and is visible to an occupant of the on-road vehicle, where the display is configured to present the exterior rendered portion of the content.

Optionally, in some embodiments, the display is configured to move in synchronization with the on-road vehicle along the path.

Optionally, in some embodiments, guiding the on-road vehicle along the path includes sending a first command to a control system of the on-road vehicle in electrical communication with the entertainment system, where the control system is configured to cause the movement of the on-road vehicle along the path based on the first command.

Optionally, in some embodiments, displaying the generated content includes sending a second command and an interior rendered portion of the content to the control system, where the control system is configured to present the interior rendered portion of the content inside of the on-road vehicle.

Optionally, in some embodiments, the interior rendered portion of the content is synchronized with the exterior rendered portion of the content.

In some embodiments, an entertainment system for a vehicle is disclosed. In one embodiment, the entertainment system includes a guide system to receive and guide an on-road vehicle along an entertainment track, wherein the on-road vehicle is guided autonomously; at least one processor configured to identify a make and model of the on-road vehicle, the at least one processor coupled to a communication system positioned before an entrance of the guide system; and a content output system in communication with the guide system and the at least one processor configured to generate content based on characteristics of the on-road vehicle, wherein the characteristics of the on-road vehicle are determined based on the identified make and model of the on-road vehicle, and wherein the generated content is presented to one or more occupants of the on-road vehicle.

Optionally, in some embodiments, method is disclosed. In one embodiment, the method includes identifying a make and model of an on-road vehicle; receiving the on-road vehicle at an entertainment track; guiding the on-road vehicle along the entertainment track, wherein the on-road vehicle is guided autonomously; generating content based on characteristics of the on-road vehicle, wherein the characteristics of the on-road vehicle are determined based on the identified make and model of the on-road vehicle; and presenting the generated content to one or more occupants of the on-road vehicle.

DETAILED DESCRIPTION

Figure 1:
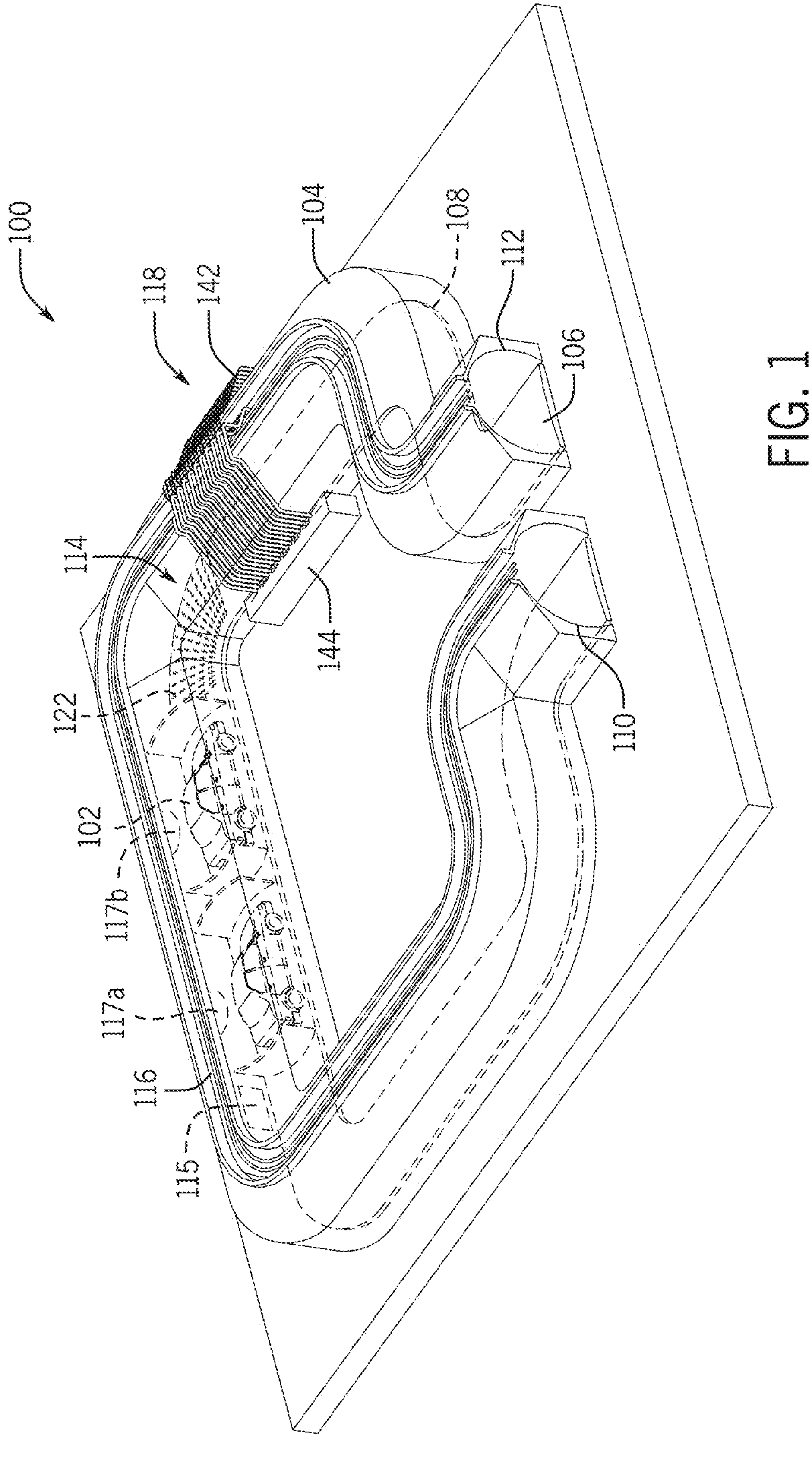
FIG. 1 is a perspective view of an entertainment system.

Cars are increasingly built to include advanced hardware and/or software, such as 5G, edge compute, powerful chipsets, high-performance computing, artificial intelligence and machine learning, computer vision, and the like. With such advanced hardware and software, cars are increasingly able to perform a wide range of advanced services. Combining such emerging technologies with immersive and interactive technology traditionally found within theme parks may create enhanced entertainment experiences using on-road vehicles.

Entertainment systems described herein may be used to provide entertainment experiences to occupants of on-road vehicles (e.g., cars and other passenger vehicles such as pick-up trucks, vans, and the like). Such entertainment systems may utilize control systems of the vehicles to provide additional content and/or to enhance content provided by the entertainment system. For example, an entertainment system described herein may include a partially or fully enclosed temporary, permanent, or semi-permanent structure with a path for vehicles from an entrance of the structure to an exit of the structure. Various displays, props, show lighting and/or special effect devices such as robots, projectors, and other devices within the structure may display and/or render content outside of and/or onto the vehicle, such as visual content, as well as sensory effects and the like that can be perceived inside the vehicle. Entertainment systems may also generate content to be rendered inside of vehicles. For example, the entertainment system may communicate with vehicles' on-board systems to adjust interior climate settings, play audio using the vehicle's sound system, display video on displays of the vehicle, turn on and off interior and exterior lights, and/or turn on and off windshield wipers to complement and enhance content provided by the entertainment system and to deliver additional content to occupants of the vehicle.

The entertainment systems may provide different experiences to vehicles based on, for example, the size, model, manufacturer, etc. of the vehicle, preferences of the occupants, number of occupants, and the like. As on-road vehicles are used in place of traditional ride vehicles, such entertainment systems may be less expensive to operate, more portable between locations, and simpler to operate and maintain than traditional amusement rides. The entertainment systems described herein may utilize vehicles primarily used for on-road driving. Such entertainment systems may be placed in or on pre-existing structures, such as large parking lots or other locations outside of traditional amusement parks. Further, the use of the occupant's own vehicle or another on-road vehicle (e.g., a rental car) in place of a traditional ride vehicle may provide a socially distanced experience where desired.

In various examples, the entertainment system may accommodate autonomous (e.g., self-driving vehicles) and non-autonomous vehicles. For autonomous vehicles, the entertainment system may connect with control systems of the vehicle to navigate the vehicle through a structure of the entertainment system. For non-autonomous vehicles, the entertainment system may include various types of conveyance systems to move vehicles through the structure of the entertainment system.

When a vehicle arrives at the entertainment system, the system may detect the vehicle and generate content to create an experience for the occupants of the vehicle. In some examples, the entertainment system may provide the same or a similar experience (e.g., a storm or weather-themed experience) to all vehicles. In some examples, different or personalized experiences may be available to different vehicles and/or occupants may select an experience using, for example, their own mobile devices, displays or other control systems of the vehicle, touch screens forming part of the entertainment system, and the like. Once the entertainment system generates content, the vehicle moves through the structure of the entertainment system as the content is delivered to the vehicle to create the desired experience.

For example, the entertainment system may deliver an experience simulating the vehicle driving through a storm as the vehicle moves through the structure of the entertainment system. The entertainment system may include a projector and various screens on which the projector displays video or image content of storms as the vehicle moves through the structure. The entertainment system may connect with the vehicle to, for example utilize the vehicle's audio system to deliver a weather report about the storm while a heads up display in the vehicle displays a navigational map showing an alert about entering the area of the storm. As the vehicle moves through the structure, the entertainment system may produce various sensory effects. For example, the entertainment system may spray water on the vehicle to simulate rainfall, while communicating with the control systems of the vehicle to turn on the windshield wipers as the vehicle moves through the simulated rainfall. The entertainment system may produce other sensory effects in various examples, such as lighting, audio, tactile, olfactory, or other effects to deliver content and/or to enhance the experience for the vehicle occupants.

Because entertainment systems described herein utilize the user's own vehicles, the entertainment systems may be located in a variety of places and may be used to provide content and/or entertainment as a supplement to other goods and services such as drive through services. Further, because the entertainment systems may include temporary or semi-permanent elements, the systems may be less expensive and quicker to assemble and build than traditional ride systems. Additionally, due to the ability to present various content inside of the vehicle, different users may be presented with different experiences based on the needs and/or preferences of the users, including recommendations for the users based on information from an external data source about the user (e.g., a user profile, preferred genres of content, and the like).

Turning now to the figures, FIG. 1 illustrates an entertainment system 100 (e.g., an infotainment system) providing content to a vehicle 102 moving through a structure 104 of the entertainment system 100. The structure 104 may include a base 106 and a wall 108 extending over the base 106 to create the structure 104 (e.g., a partially enclosed structure). The structure 104 generally includes an entrance 110 and an exit 112, with a path 114 through the structure 104 extending from the entrance 110 to the exit 112. The structure 104 may include additional elements to deliver content and/or to facilitate delivery of content in various examples. For example, the structure 104 shown in FIG. 1 includes a track 116 which may facilitate movement of display components, such as the projector assembly 120 of FIG. 2. The structure 104 of FIG. 1 further includes environmental elements 118 which may, for example, produce fog effects, spray water on the vehicle 102, produce lighting effects, produce temperature changes, produce olfactory effects, and the like.

The structure 104 may be a temporary, semi-permanent, or permanent structure. Structure 104 may be single-story or multi-story with ramps and/or elevators to move vehicle 102 between stories. Structure 104 may implement a single path 114, multiple paths 114, as well as branching or non-branching paths 114. In the example shown in FIG. 1, the structure 104 is a partially enclosed structure with a passageway therethrough, e.g., a tunnel shaped structure formed by the wall 108 extending over the base 106 in a semi-circular shape. The structure 104 may be covered or enclosed and may be elongated to define a path 114 therethrough. In some examples, the entrance 110 and/or the exit 112 may not be visible or may be obscured to generate an immersive experience. In other examples, the structure 104 may be shaped differently. For example, the wall 108 may be formed of side portions extending perpendicularly from the base 106 and a top portion connecting the side portions, such that the structure 104 is tunnel shaped with a rectangular or square cross-section. The cross section of the structure 104 may have a constant shape and size from the entrance 110 to the exit 112 or may vary in shape or size from the entrance 110 to the exit 112. In some examples, the external shape (e.g., cross section) of the structure may be different than the internal shape of the structure 104. As shown in FIG. 1, the structure 104 may curve between the entrance 110 and exit 112 along the path 114. In various examples, the structure 104 may be straight or may have more or fewer turns or curves than the structure 104 shown in FIG. 1.

In some examples, the wall 108 of the structure may be formed from several temporary features allowing the structure 104 to be assembled and disassembled. Such structure may further allow the structure 104 to be adjusted dynamically based on, for example, content being displayed for each vehicle. For example, the walls may be constructed using scaffolding and a flexible material (e.g., durable fabric or tent-like material) extended over the scaffolding to form the wall 108. In other examples, the wall 108 may be formed from multiple modular portions which fit together to assemble the structure 104. In other examples, wall 108 may be inflatable or a combination of construction techniques suitable to a particular application.

The base 106 of the structure may be the floor of the ground or other foundation on which the base 106 is positioned or, in some examples, include additional features, such as conveyance features for components of the entertainment system 100 (e.g., projection screens), conveyance features for vehicles moving through the structure 104, texture features to produce tactile effects for vehicles moving through the structure 104, and the like. For example, texture features 122 may provide a rumble effect as the vehicle moves over the texture features 122, e.g. bumps or moving platforms onto which the vehicle is positioned either for a period of time or throughout the experience.

In various examples, the base 106 may include conveyance features to allow non-autonomous vehicles to move along the path 114 through the structure 104 of the entertainment system 100. For example, the base 106 may, in some examples include a track along which a platform, sled, or other conveyance mechanism moves. For example, a non-autonomous vehicle may park on or be otherwise secured on a platform or sled while the platform or sled moves along the path 114 in some examples. In some examples, a screen or other display may be connected to a sled or platform to display content to the vehicle 102 being moved by the sled. Other types of conveyance may, for example, engage the front wheels of the vehicle 102 while the vehicle 102 is in a neutral gear, and may then move the vehicle 102 along the path 114.

In various examples, additional elements of the entertainment system 100 may be located inside of the structure 104. For example, equipment for charging electric vehicles moving along the path 114 may be located within the structure 104. In some examples, charging equipment may include portable electric chargers configured to move with the vehicle 102 along the path 114. In some examples, charging equipment may be provided as part of another feature of the entertainment system 100, such as conveyance features provided for non-autonomous vehicles. In other examples, lighting elements, scenic or thematic elements, or other stationary or moveable elements may also be located inside of the structure 104. For example, lighting elements 117*a*-117*b* may provide lighting and/or lighting effects inside of the structure 104. Scenic elements 115 may also be located inside of the structure 104 and may include, in various examples, animatronic figures, stationary figures, visual features, and the like.

Additional components of the entertainment system 100 may be located inside of the structure 104. For example, a display may be included inside of the structure 104. In various examples, a display may include any number of display areas, which may include, for example, screens, interior portions of the wall 108, self-illuminating displays, and the like. Self-illuminating displays may include, for example, LED walls. LED walls may be composed of individual LED tiles which may be clipped together to form a larger display. In some examples, such tiles may be dynamically attached to and detached from one another and/or walls 108 of the structure 104 to, for example, configure the LED walls based on the content being displayed.

Figure 2:
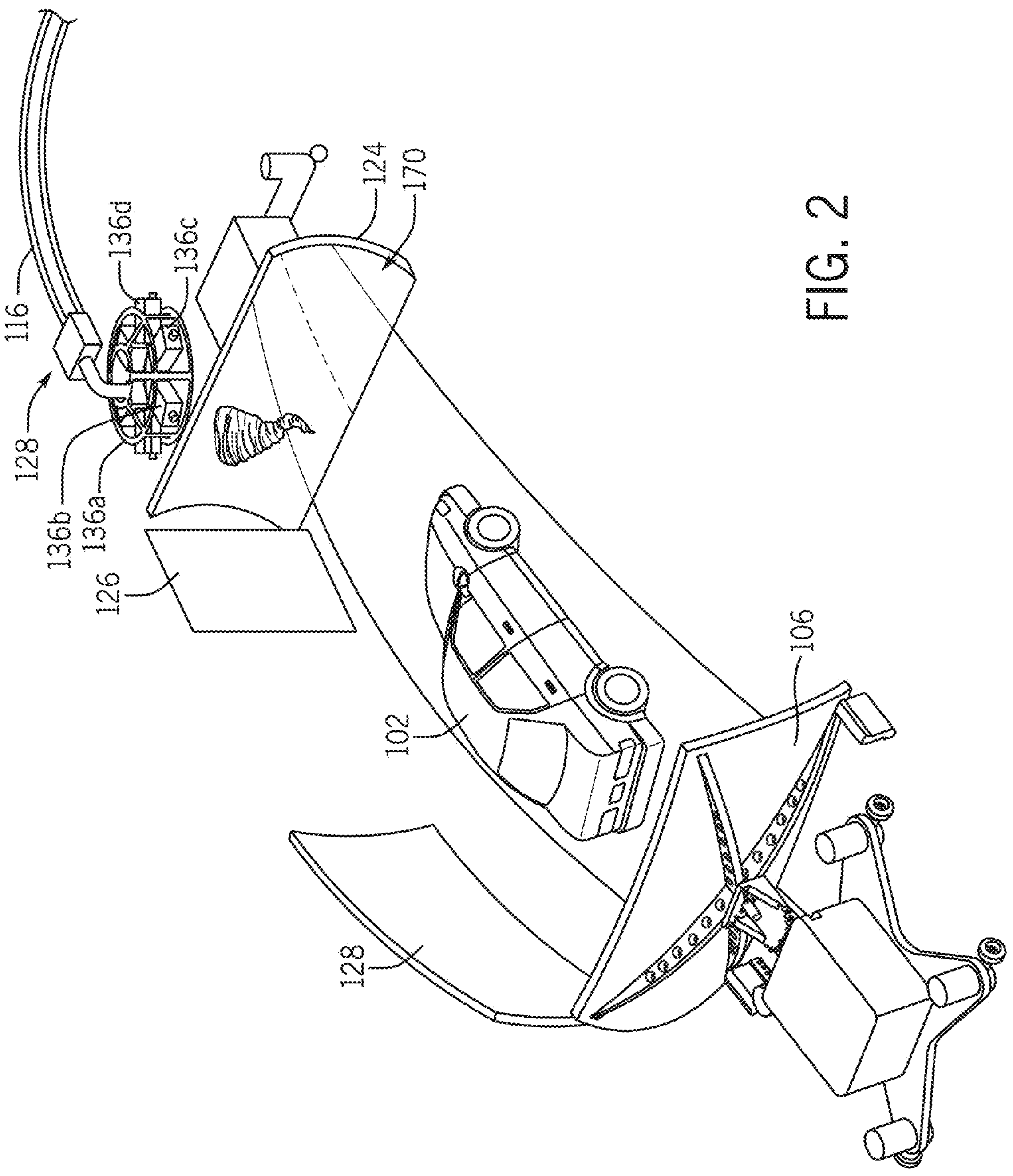
FIG. 2 is a perspective view of an interior of the entertainment system of FIG. 1.

In various examples, the display may include a projector or projection system projecting images onto display areas (e.g., screens and/or interior portions of the wall 108). For example, turning to FIG. 2, elements of an example display, including a projector assembly 120 and display areas 124, 126, and 128 may be located inside of the structure 104. The display areas 124, 126, and 128 may include one or more front- or rear-projection screens, monitors, televisions, half-mirrors configured as Peppers' Ghost illusions, or other displays. Various display areas within the structure 104 may move with the vehicle 102 along the path 114. Some display areas may be stationary with respect to the structure 104. For example, display area 126 may be mounted on, and stationary with respect to, the wall 108 of the structure 104. Some display areas may move with respect to the structure 104 while remaining stationary along the path 114. For example, display area 128 may be mounted on an interior of the structure 104 such that the display area 128 may pivot with respect to the structure 104 as the vehicle 102 approaches and passes the display area 128 along the path 114. Though FIG. 2 shows three display areas, more or fewer display areas may be included and/or utilized as part of the display of the entertainment system 100. For example another display area may move along the path 114 behind the vehicle 102.

Figure 3:
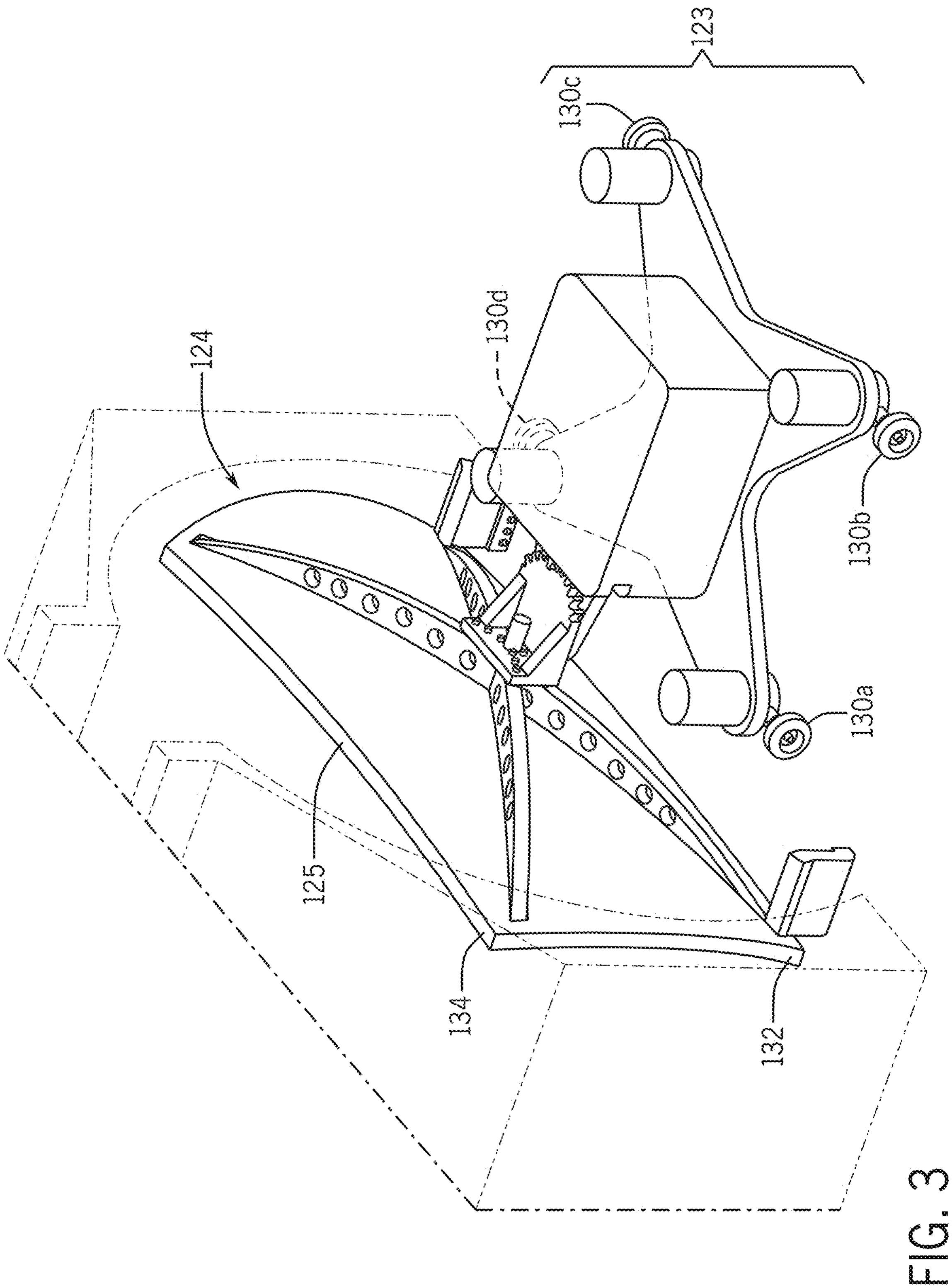
FIG. 3 is a perspective view of an example display area of the entertainment system of FIG. 1.

With reference to FIG. 3, a display area 124 may be configured to move along the path 114 as the vehicle 102 moves along the path 114. In various examples, different entertainment components, such as display areas (e.g., screens), fans, lighting elements, and the like may be configured to move along the path 114 as the vehicle 102 moves along the path 114. As shown in FIG. 3, the display area 124 may be a screen including a screen portion 125 and a drive portion 123. The display area 124 is referred to hereinafter as screen 124. The screen portion 125 may be connected to the drive portion 123 by a mounting assembly 131 enabling the screen portion 125 to move (e.g., pivot) with respect to the drive portion 123. The drive portion 123 in FIG. 3 includes wheels 130*a*-130*d* to enable to screen 124 to move along the path 114. In other examples, the drive portion 123 may include other structures to move the screen 124 along the path 114, such as a drone, mounting to a track, and the like. The drive portion 123 may include hardware and/or software enabling the screen 124 to steer along the path 114 without a track or other steering mechanism in the base 106 of the structure 104. In some examples, the drive portion 123 may instead be configured to move along a track in the path 114. The drive portion 123 may further include hardware configured to control the rate of movement of the screen 124 to match the rate of movement of the vehicle 102, including any acceleration or deceleration changes of the vehicle 102. Accordingly, hardware of the drive portion 123 may include hardware and/or software to communicate with other components of the entertainment system 100 to match the rate of movement of the screen 124 to the rate of the vehicle 102. Other entertainment components configured to move along the path 114 as the vehicle 102 moves along the path 114 may have drive portions similar to drive portion 123.

The screen portion 125 of the screen 124 may have a parabolic, elliptical, or other simple or complex curved or non-planar cross section. Such a cross section may allow a bottom edge 132 of the screen portion 125 to extend below the bumper of the vehicle 102 while a top edge 134 of the screen portion 125 extends above the roof of the vehicle 102. Accordingly, the bottom edge 132 and the top edge 134 of the screen portion 125 may not be visible to occupants of the vehicle 102, creating an immersive experience for the occupants of the vehicle.

With reference again to FIG. 2, the projector assembly 120 may project visual content onto one or more of the display areas 124, 126, and 128. In some examples, the projector assembly 120 may project additional content onto the interior of the wall 108 of the structure 104. In some examples, the projector assembly 120 may be configured to project content in 360° using a plurality of projectors (e.g., projectors 136*a*-136*d*) making up the projector assembly 120. The projector assembly 120 may further be configured to project content in other degree increments by using a subset of the projectors in the projector assembly 120. For example, where no content is projected behind the vehicle 102, the projector 136*b* may not project content, such that the projector assembly 120 projects content in less than 360°. In various examples, the structure 104 may include multiple fixed projector assemblies 120, such that various projector assemblies 120 are distributed along the path 114 of the structure 104. Such distributed projector assemblies 120 may be placed to project content on certain display areas 124, 126, 128 within the structure 104 and may be coordinated with a controller.

Figure 4:
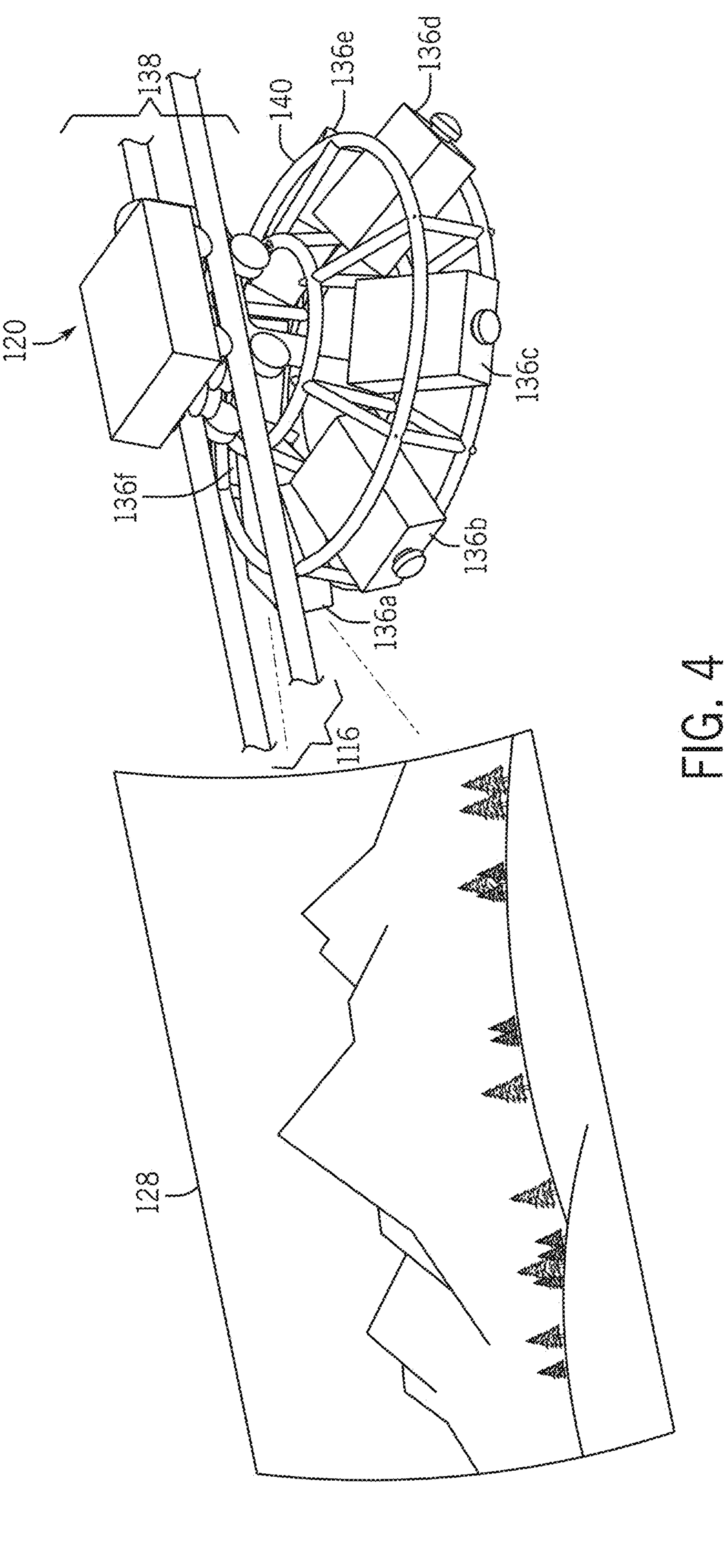
FIG. 4 illustrates an example projector of the entertainment system of FIG. 1.

With reference to FIG. 4, the projector assembly 120 may include a drive portion 138 and a support 140 connected to the drive portion 138 to support the projectors 136*a*-136*f*. The drive portion 138 may drive the projector assembly 120 along the track 116 at a rate synchronized with, in various examples, the screen 124 and the vehicle 102. Accordingly, the projector assembly 120 may include hardware and/or software for communication with other components of the entertainment system 100 configured to control the motion of the projector assembly 120 and to provide content to the projector assembly 120 for projection to the display areas 124, 126, and 128. In some examples, the support 140 of the projector assembly 120 may be connected to the drive portion 138 such that the support 140 may move relative to the drive portion 138. For example, the support 140 may pivot, rotate, and/or change elevation with respect to the drive portion 138. In these examples, the drive portion 138 may include hardware and/or software and controls configured to control such motion of the support 140. Similarly, in some examples, the projectors 136*a*-136*f* may be mounted or connected to the support 140 such that the projectors 136*a*-136*f* do not move with respect to the support 140. In other examples, the projectors 136*a*-136*f* may be connected to the support 140 such that the projectors 136*a*-136*f* are able to move (e.g., pivot) with respect to the support 140. For example, any of the projectors 136*a*-136*f* may be configured to tilt upwards towards the drive portion 138 such that the projection assembly 120 can display content on the top portion of the structure 104. In various examples, any of the projectors 136*a*-136*f* may further adjust their orientation with respect to the drive portion 138 by adjusting roll, pitch, and/or yaw. Moreover, some or all of the projectors 136*a*-136*f* may be mounted on motorized actuators to enable them to move with respect to the projector assembly 120 to provide moving projections.

Though the display is shown as including the projector assembly 120 and screens 124, 126, and 128, the display may, in various examples, include additional elements configured to display content outside of the vehicle (e.g., exterior content). For example, the display may include, in addition to or instead of the projector 120 and screens 124, 126, and 128, video screens which directly receive and display content from other components of the entertainment system 100 instead of the projector 120 projecting the content.

Various components of the entertainment system 100 may provide other types of exterior rendered content to complement and/or enhance exterior rendered content displayed by the display. For example, lighting elements, audio systems, environmental elements 118, fixed and/or animatronic props, fountains, special effects and the like may provide additional content. For example, where the exterior rendered content is related to storms, lighting elements may be used to provide a lightning effect, audio systems may provide sound effects of thunder, tornado sirens, and tactile elements may be used to make the vehicle shake.

With reference to FIG. 1, in various examples, environmental elements 118 may be configured to spray water or other liquid on the vehicle 102, deliver fog effects inside the structure 104, blow air on the vehicle 102, provide heating and/or cooling effects, and the like. The environmental elements 118 shown in FIG. 1 may be configured to spray water on the vehicle 102 as the vehicle 102 passes under the environmental elements 118. In such examples, the environmental elements 118 may be placed over one or more openings in the structure 104 such that the environmental elements are exposed to the interior of the structure 104. In the example shown in FIG. 1, the environmental elements 118 include sprayers (e.g., sprayer 142) and a water return system 144, which may recover and treat water from the interior of the structure 104 and deliver the water to the sprayers of the environmental element 118.

Though the environmental element 118 is shown mounted over the wall 108 of the structure 104, in other examples, the environmental element 118 may be provided on the interior of the structure 104. Further, though one environmental element 118 is shown in the entertainment system 100, multiple environmental elements 118 may be used in various examples. In some examples, one environmental element 118 may be configured to deliver multiple effects at one time and/or sequentially. For example, to simulate a strong storm, an environmental element 118 may spray water on the vehicle 102 to simulate rainfall while also blowing air at the vehicle 102 to simulate a tornado or strong winds. In some examples, air blown on the vehicle 102 may be provided with an odor or smell. In various examples, the environmental element 118 may be in communication with other elements of the entertainment system 100 to time the effects of the environmental element 118. For example, a content output system may trigger the environmental element 118 such that the effects are provided when the vehicle 102 is stopped under, or moving under the environmental element 118 and when other components (e.g., screen 124) are clear of the environmental element 118 to prevent damage to the other components. In other examples, the environmental element 118 may communicate directly with the vehicle 102 and/or utilize sensors to detect the vehicle 102 and time delivery of various effects of the environmental element 118. In some examples, user input may trigger the environmental element 118 by communication such input to the content output system to trigger the environmental element 118.

Figure 5:
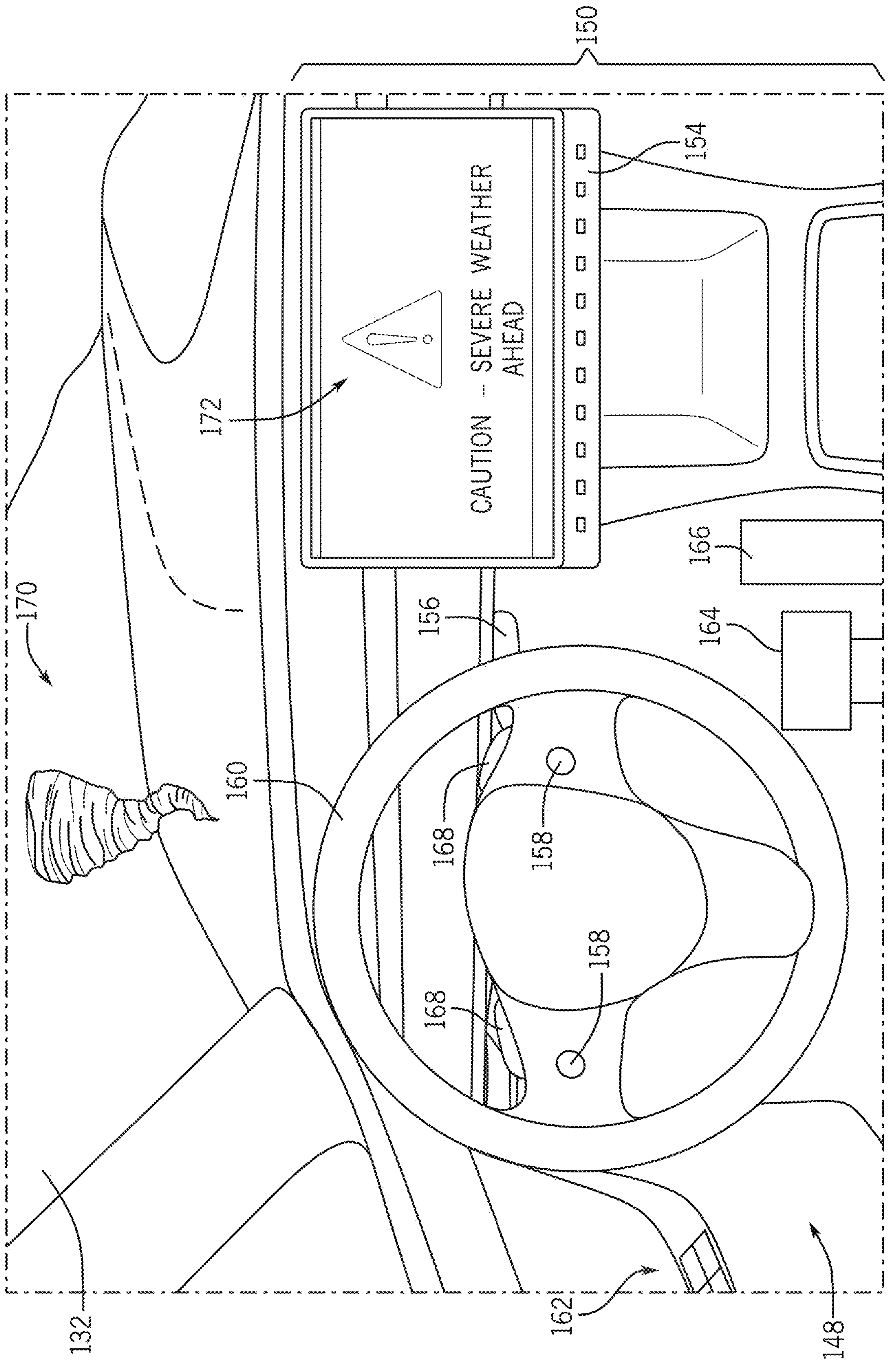
FIG. 5 is an interior view of a portion of an example of a control system of the vehicle in use with the entertainment system of FIG. 1.

With reference to FIG. 5, an example of a vehicle interior 148 of a vehicle 102 is shown. Various components of the vehicle interior (e.g., a cabin) 148 may be used to render and deliver interior rendered content perceived within the vehicle 102. The vehicle interior 148 shows certain on-board components 151 which may be controlled by a control system of the vehicle 104. The control system may control on-board components 151 of various systems including one or more of an audio system, a vehicle lighting system (e.g., including head a tail lights, interior lights, and the like), a heads-up display on a windshield 132, an internal display 154 such as a touch screen, a windshield wiper control 156, a powertrain, an operator control 158, a steering wheel 160, a window control 162, a mirror control, a moon roof control, a brake control 164, an accelerator 166, a shifter control 168, a vehicle climate control, a vehicle infotainment system, a door actuator, a trunk actuator, a seat heater, a seat cooler, a seat massage device, a seat positioner, a clutch, or the like. In various examples, the control system 150 may further control additional on-board systems including a GPS or self-driving module providing localization and navigation using optical markers, LIDAR, RF triangulation, or the like which allows the vehicle 102 to self-navigate along the path 114 through the experience.

The control system of the vehicle may communicate with components of the entertainment system 100 to present interior rendered content using various on-board components 151 of the vehicle interior 148. The interior rendered content may be synchronized with exterior rendered content presented by the entertainment system 100 such that the interior rendered content complements the exterior rendered content. For example, as shown in FIG. 5, the content 170 displayed on the screen 124 is visible from the interior 148 of the vehicle 102, showing a tornado touching down on the road in front of the vehicle 102. Interior rendered content may include, as shown in FIG. 5, a storm warning appearing as interior rendered content 172 on the internal display 154 of the vehicle. Other interior rendered content may include, for example, weather reports played over the audio system of the vehicle 102, activation of seat heating or cooling elements, movement of the steering wheel to move the vehicle responsive to external wind (e.g., air delivered by the environmental system 118), activation of windshield wipers during simulated rain (e.g., water sprayed by the environmental system 118), rolling windows of the vehicle 102 up and down, and the like.

In addition to interior rendered content presented using elements of the vehicle interior 148, interior rendered content may, in some examples, be presented using other devices inside of the vehicle 102, such as mobile devices belonging to the occupants of the vehicle 102. Mobile devices may include, for example, mobile phones, tablets, smart watches or other wearables, augmented reality (AR) wearables (e.g., AR glasses), and the like. For example, where the entertainment system 100 is used to simulate going through a storm, storm warnings may be presented as interior rendered content using mobile devices present in the vehicle 102. Such interior rendered content may be delivered by the entertainment system 100 using Wi-Fi, Bluetooth, 5G network connectivity, and other wireless protocols.

In some examples, various on-board components 151 of the vehicle may be further used to provide input to the entertainment system 100 to interact with the environment presented by the entertainment system 100. For example, the steering wheel 160 may act as a control to "steer" the vehicle 102 with respect to the scene in the exterior rendered content 170. During an experience with entertainment system 100, the steering wheel may be disengaged partially or wholly from turning the wheels of the vehicle 102. Accordingly, moving the steering wheel 160 may change how the exterior rendered content 170 is viewed from the perspective of the vehicle 102 without actually changing the direction of the vehicle 102. Other components, such as operator control 158, window control 162, and the like may further be disengaged from their normal vehicle operation and made operable to receive user input during an experience with entertainment system 100. For example, the experience of the entertainment system 100 may include game-like functions and vehicle controls may be operable to change scenes, trigger projectiles, or other in-game functions. In some examples, user mobile devices may be used to control similar functions through, for example, an application in communication with the entertainment system 100.

Figure 6:
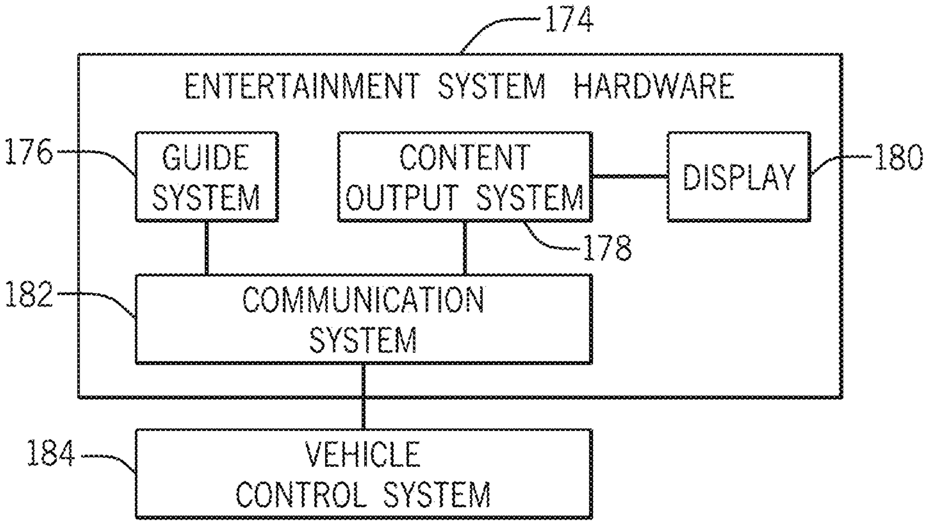
FIG. 6 is a block diagram of example components of the entertainment system of FIG. 1.

Turning to FIG. 6, The entertainment system 100 may include entertainment system hardware 174 for generating and delivering content to the vehicle 102 moving through the structure 104 of the entertainment system 100. The entertainment system hardware and/or software 174 may further control synchronization of interior rendered content and exterior rendered content. Generally, the entertainment system hardware and/or software 174 includes a guide system providing instructions to guide the vehicle 102 along the path 114 through the structure 104 and a content output system 178 providing instructions to display content to both the display 180 of the entertainment system 100 and the vehicle control system 150. The vehicle control system 150 may control various on-board components 151 to render interior rendered content in the vehicle 102. In various examples, the display 180 of the entertainment system may include any number of display areas, projection systems, interior portions of the wall 108, self-illuminating displays, projection systems (e.g., projector assembly 120) and the like.

The content output system 178 may communicate with the display 180 and other elements of the entertainment system 100 to display exterior rendered content to the occupants of the vehicle 102. The content output system 178 may further communication with the communication system 182 in order to communicate instructions to the vehicle control system 150 for displaying interior rendered content using components of the vehicle control system 150. In various examples, the content output system 178 may generate content based on, for example, the size of the vehicle 102, model of the vehicle 102, number of occupants of the vehicle, occupant's subscription to or ownership of digital content, selection of a specific experience and the like. For example, the content output system 178 may generate exterior rendered content for display using the projector assembly 120 of the display 180. A visual portion of the exterior rendered content may be generated and/or rendered differently for, for example, a truck and a compact car. For example, the perspective of the visual content may be adjusted based on the type and/or size of the vehicle. Similarly, the content output system 178 may generate content differently when there are occupants in a back seat of the vehicle 102 as opposed to only the front seats. For example, the projector assembly may be configured to display visual content in 360° where there are occupants in the back seat of the vehicle 102.

When the content is generated, the content output system 178 may provide instructions for display of exterior rendered content to the display 180 and/or other components of the entertainment system 100. Such content may include video content, guidance information for components of the display 180 (e.g., the projector assembly 120 and the screen 124), timing cues for effects (e.g., lighting and sound cues, environmental effects produced by the environmental system 118), and the like. In some examples, the content output system 178 may further receive input from the control system 150 of the vehicle 102 (e.g., input from on-board components 151 and/or controls of the vehicle 102 in a gaming experience), where the input affects how the exterior rendered content is displayed. Upon receipt of such input, the content output system 178 may communicate updated instructions to the display 180 to change how the exterior rendered content is displayed.

The content output system 178 may further provide instructions for presentation and/or display of interior rendered content to the communication system 182 for communication to the vehicle control system 150. The vehicle control system 150 may then control on-board components 151 of the vehicle 102 to render such interior rendered content. Such instructions may include commands to perform specific actions at various points in time (e.g., actuating windshield wipers of the vehicle 102, turning on headlights of the vehicle 102) and may further include content, such as visual portions of interior rendered content 172 to be displayed at an interior display 154 of the vehicle 102 and/or audio portions of interior rendered content 172 to be played through the audio system of the vehicle 102. The instructions communicated to the vehicle control system 150 may further include instructions to configure components of the vehicle control system 150 for input of information or commands to the content output system 178. In various examples, the content output system 178 may further communicate with other devices, such as mobile devices within the vehicle 102 to display additional content and/or to obtain additional input. For example, mobile devices within the vehicle 102 may be used to interact with and/or change content being displayed outside of the vehicle 102/Such communications may be made via various wireless protocols such as Wi-Fi, Bluetooth, cellular data, 5G network connectivity, and the like. The content output system 178 may further communicate with one or more databases or data storage locations which may, for example, store instructions for generating content of various experiences. In some examples, such instructions may be locally stored at the entertainment system hardware 174.

In the example of autonomous vehicles, the guide system 176 generally provides instructions to the communication system 182 to pass to the vehicle control system 150 to guide the vehicle 102 along the path 114 through the structure 104. For example, the guide system 176 may provide a series of waypoints along the path 114 and time codes to the vehicle control system 150, via the communication system 182. The vehicle control system 150 may then guide the vehicle 102 along the path 114 autonomously using the waypoints generated by the guide system 176. The guide system 176 may further provide timing cues for speeding up, slowing down, and/or stopping the vehicle for predetermined intervals to the vehicle control system 150. The vehicle control system 150 may then interpret the timing cues along with the waypoints to guide the vehicle 102 along the path 114 through the structure 104.

In the example of non-autonomous vehicles, the guide system 176 may provide instructions to components of the entertainment system 100 (e.g., conveyance systems) used to guide the vehicle 102 along the path 114 through the structure 104. For example, the guide system 176 may control the speed and direction of a sled or platform transporting the vehicle 102 along the path 114. In some examples, the guide system 176 may similarly control other conveyance systems guiding a non-autonomous vehicle along the path 114 in synchronization with display of the content by the entertainment system 100. In some examples, an occupant of the vehicle 102 may navigate the vehicle 102 through the structure 104 with instructions and/or assistance from the guide system 176. For example, the guide system 176 may display (e.g., at an interior display 154) instructions to set cruise control at a particular speed and/or turning cues to follow to navigate the vehicle 102 through the structure 104.

The communication system 182 generally communicates with the vehicle control system 150 of the vehicle. The communication system 182 may communicate with the vehicle 102 using various protocols. For example, the communication system 182 may communicate with a dongle or other hardware coupled with a controller area network (CAN) port or on-board diagnostics (OBD)-II port in the vehicle 102 to communicate instructions to the vehicle 102. In some examples, the communication system 182 may wirelessly communicate with the vehicle 102 using wireless protocols. For example, the communication system 182 may format instructions from the guide system 176 and/or the content output system 178 in a JSON file transmitted to the vehicle control system 150 using, for example, an application programming interface (API) of the vehicle. In some examples, the communication system 182 may use other existing communication systems (e.g., ONSTAR systems) to communicate instructions to the vehicle control system 150. In various examples, the communication system may be configured for use of multiple protocols for communicating with vehicles in the entertainment system 100. For example, some types of vehicles may be capable of using custom JSON files while others may be able to communicate via a dongle. The communication system 182 may access information about the model of vehicle and its communication capabilities to select an appropriate communication protocol for the vehicle 102.

In various examples, the communication system 182 may provide a secure communications interface to the vehicle 102. For example, the communication system 182 may provide a key to the vehicle control system 150 before the communication control system 150 accepts instructions and/or commands from the communication system 182. In some examples, the occupants of the vehicle may physically place a component (e.g., a custom dongle for a CAN or OBD-II port) in the vehicle for communication with the communication system 182, providing additional security for communications with the communication system 182. In various examples, the communication system 182 and the vehicle control system 150 may execute a handshake protocol or other method of verification before the vehicle control system 150 accepts instructions and/or commands from the communication system 182.

In various examples, the guide system 176 and the content output system 178 may communication with one another in order to synchronize delivery of interior and exterior rendered content with movement of the vehicle 102 along the path 114. For example, the content output system 178 may communicate with the projector assembly 120 and the screen 124 to move the screen 124 along the path 114 and the projector assembly 120 along the track 116, while the guide system 176 may communicate with the communication system 182 to provide instructions for motion of the vehicle 102 along the path 114. The content output system 178 may communicate with the guide system 176 to obtain information about the motion of the vehicle 102 such that the projector assembly 120 and the screen 124 move with the vehicle 102 (e.g., accelerate, brake, and change directions at the same locations and/or times as the vehicle 102). In some examples, the content output system 178 may generate content for output and may generate vehicle motion instructions with the content to synchronize the vehicle motion with the content. In these examples, the content output system 178 may communicate the vehicle motion instructions to the guide system 176. The guide system may, in some examples, format the instructions from the content output system 178 for communication to the vehicle control system 150.

In some examples, the content output system and/or the guide system may further be in communication with various sensors or may receive other inputs for identifying the vehicle 102 as the vehicle 102 reaches the entertainment system 100. For example, a visual system may be used to, for example, scan barcodes, VINs, or other identifiers on vehicles as they approach the entertainment system 100. In some examples, the entertainment system 100 may include a touch screen or may communication with a mobile application used by occupants of the vehicle 102 to select options for experiences, identify the vehicle type, and the like.

Figure 7:
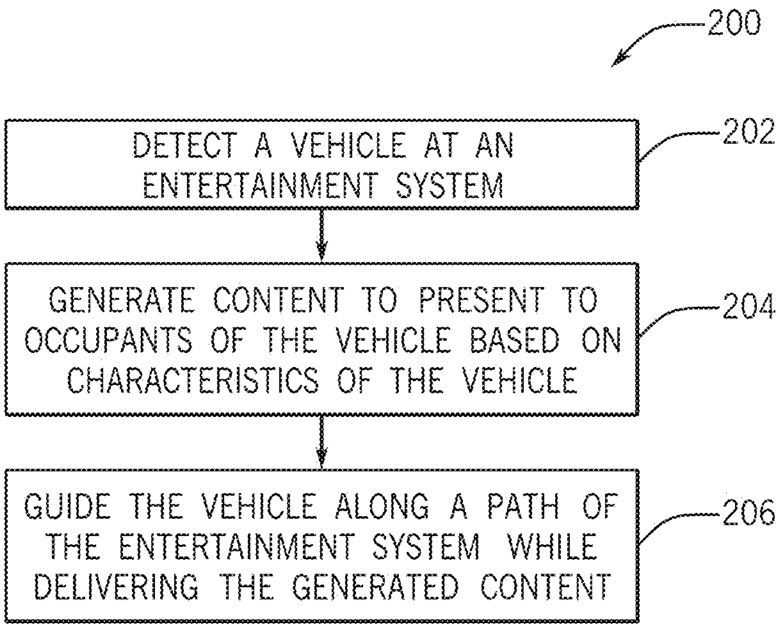
FIG. 7 is a flow chart illustrating an example method of providing content to occupants of a vehicle using the entertainment system of FIG. 1.

FIG. 7 illustrates an example method 200 of providing content to occupants of a vehicle 102 using the entertainment system 100 described herein. At block 202, the entertainment system 100 detects a vehicle at the entertainment system 100. The entertainment system hardware and/or software 174 may, for example, receive input from sensors of the entertainment system 100 indicating that a new vehicle has approached the entertainment system 100. In some examples the entertainment system hardware and/or software 174 may receive additional information from the vehicle 102 to identify the vehicle 102 (e.g., type, make and model) and/or preferences for the experience delivered by the entertainment system 100. For example, the entertainment system 100 may be used with fleet cars (e.g., rental cars) outfitted with barcodes that may be scanned by sensors of the entertainment system 100 to obtain information about the vehicle. In some examples, transponders inside the vehicle may be used to communicate information about the vehicle and its occupants to the entertainment system 100. For example, the occupants may each have identification (e.g., RFID wearable devices) readable by the entertainment system 100 to obtain information about the occupants, including number of occupants, ages of the occupants, and the like.

In various examples, the entertainment system 100 may communicate with mobile devices and/or other inputs (e.g., touch screens at or outside of the entrance 110 to the structure 104) to obtain vehicle information and/or additional experience preferences. For example, occupants of the vehicle 102 may utilize a mobile application to select an experience (e.g., a certain theme) and to otherwise customize the experience. For example, the mobile application may include fields for providing number of occupants, names and ages of occupants, and the like. In some examples, customizing the experience may further include options to "share" an experience with multiple vehicles by associating the vehicles with one another and moving the vehicles through the structure 104 at the same time to create a common experience. In some examples, the common experience may include a game-like experience where occupants of the associated vehicles may compete against one another and/or interact with one another within the experience.

The entertainment system hardware and/or software 174 generates content to present to occupants of the vehicle 102 based on characteristics of the vehicle 102 at block 204. Such generation of content may include real-time generation of new content and/or retrieval of existing content. Generating content may include, in various examples, selecting an experience (and content associated with the experience) based on characteristics of the vehicle and/or input from the occupants of the vehicle 102. For example, the occupants may select an available experience and the content output system 178 may retrieve content associated with the experience at block 204. In some examples, the experience and associated content may be selected based on characteristics of the vehicle, such as the make and model of the vehicle. For example, certain experiences may be provided exclusively to certain makes of vehicles. In other examples, the experience and content may be instructions relating to the vehicle 102 and the experience may accordingly be selected to correspond to the make of the vehicle 102.

In some examples, the content output system 178 may retrieve content and format the retrieved content based on capabilities of the vehicle. For example, some makes and models of vehicles may include heated seats, and the content may include commands to turn on and off the heated seats at specific points during the experience. Other makes and models of vehicles may not have heated seats or other such features and the generated content may, accordingly, not include instructions related to those features. Further, the content may be formatted differently for autonomous and non-autonomous vehicles. For example, non-autonomous vehicles may be moved along the path 114 using sleds attached to one or more screens. Video content may be formatted differently for such screens if they are, for example, located closer to the vehicle 102 than a screen 124 would be located to an autonomous vehicle.

Content may further be generated differently based on the size and other physical characteristics of the vehicle 102. For example, occupants of a taller vehicle may have different sight lines than occupants of vehicles closer to the ground. The content may, accordingly, be generated such that when displayed by the display 180, important components of visible content are within the sight line of occupants of the vehicle 102. For example, the content output system 178 may transmit different visual output to the projection assembly 120 and/or may transmit instructions to the projection assembly 120 to adjust angles of one or more projectors 136*a*-136*f* to display content in the line of sight of occupants of the vehicle 102.

In some examples, the content output system 178 may further generate guidance information for the vehicle 102 to synchronize the movement of the vehicle 102 with the content. In these examples, generation of the content may include transmitting or communicating such guidance information to the guide system 176.

At block 206, the guide system 176 guides the vehicle along the path 114 of the entertainment system 100 while the content output system 178 delivers the generated content. Generally, the guide system 176 may guide the vehicle 102 along the path either by communicating guidance instructions to the vehicle control system 150 via the communication system 182 and/or by providing control instructions to one or more conveyance systems for vehicles within the structure 104 of the entertainment system 100. For example, for autonomous vehicles, the guide system 176 may transmit waypoints and time cues to the communication system 182 for communication to the vehicle control system 150 of the vehicle 102. The vehicle control system 150 may then interpret the information from the guide system 176 to move the vehicle 102 along the path 114 in accordance with the waypoints and time cues. For non-autonomous vehicles, the guide system 176 may transmit control signals to the conveyance systems of the entertainment system 100 used to convey the vehicle 102 to move the vehicle 102 along the path 114. In another example, the vehicle 102 may utilize computer vision technology (e.g., LiDAR) to detect items (e.g., markers) placed by the guide system 176 along the path 114 to navigate the vehicle 102 along the path 114.

As the vehicle 102 moves along the path 114 in accordance with the instructions provided by the guide system 176, the entertainment system 100 delivers content in accordance with instructions provided by the content output system 178. For example, the projector assembly 120 may project content on display areas 124, 126, and 128 as the vehicle 102 moves along the path 114. In these examples, the projector assembly 120 and some display areas (e.g., display area 124) may move with the vehicle 102 such that the output of the exterior rendered content is synchronized with the motion of the vehicle 102. In some examples, the content output system may further provide instructions to the vehicle control system 150, via the communication system 182, to display interior rendered content inside of the vehicle synchronized with the exterior rendered content and the motion of the vehicle 102. For example, the interior rendered content may be transmitted with time cues and/or time stamps such that the interior rendered content is synchronized with the exterior rendered content and the motion of the vehicle 102.

In some examples, the occupants of the vehicle 102 may receive goods and/or services at the exit 112 of the structure 104 and/or as the vehicle 102 moves through the structure 104. For example, robots and/or animatronic figures may deliver food, consumer goods, etc. to the vehicle 102 during or at the conclusion of the experience. For example, animatronic figures may deliver goods, drop goods, and/or otherwise interact with the vehicle 102 during the experience. As a specific example, the entrance of the entertainment system may correspond to an order window or other location to place an order for goods and the pathway and the exit (or other location within) of the entertainment system may correspond to a delivery of goods. In this manner, the occupants within the vehicle may be entertained while waiting for the goods to be prepared. In some examples, the content may be related to goods or services. For example, the experience may include information about the vehicle 102, a destination, or both where the entertainment system 100 is utilized at a car rental location.

In accordance with the above disclosure, the entertainment system 100 may utilize on-road vehicles (e.g., passenger vehicles) as part of the experience for occupants of the vehicle, and may control various features of the on-road vehicles to complement content presented by the entertainment system 100 to create an immersive experience for occupants of the vehicles. The entertainment system 100 may, accordingly, be less expensive to construct and maintain than one with traditional custom ride vehicles and may be constructed in a variety of locations, including outside of traditional amusement park environments. Further, the entertainment system 100 may be useful in a variety of settings, such as restaurant take out or drive through locations, rental car pickup locations, car dealerships, parking lots, and the like.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms “a” and “an” are taken to mean “one”, “at least one” or “one or more”. Unless otherwise required by context, singular terms used herein shall include pluralities and plural terms shall include the singular.

Unless the context clearly requires otherwise, throughout the description and the claims, the words ‘comprise’, ‘comprising’, and the like are to be construed in an inclusive sense as opposed to an exclusive or exhaustive sense; that is to say, in the sense of “including, but not limited to”. Words using the singular or plural number also include the plural and singular number, respectively. Additionally, the words “herein,” “above,” and “below” and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An entertainment system comprising:

a guide system to receive and guide an on-road vehicle along an entertainment track, wherein the on-road vehicle is guided autonomously;

at least one processor configured to identify a make and model of the on-road vehicle, the at least one processor coupled to a communication system positioned before an entrance of the guide system; and a content output system in communication with the guide system and the at least one processor configured to generate content and guidance information for the on-road vehicle based on characteristics of the on-road vehicle, wherein the characteristics of the on-road vehicle are determined based on the identified make and model of the on-road vehicle, wherein the guidance information is configured to synchronize movement of the on-road vehicle with the generated content, and wherein the generated content is presented to one or more occupants of the on-road vehicle.

2. The entertainment system of claim 1, wherein the one or more characteristics of the on-road vehicle comprise one or more of a size parameter of the on-road vehicle, an interior feature of the on-road vehicle, an exterior feature of the on-road vehicle, an entertainment system of the on-road vehicle, a number of displays of the on-road vehicle, an audio system of the on-road vehicle, or a number of occupants of the on-road vehicle.

3. The entertainment system of claim 1, wherein the at least one processor is further configured to communicate with the on-road vehicle via a communication protocol.

4. The entertainment system of claim 3, wherein the at least one processor is further configured to:

generate a secure communication interface with the on-road vehicle, wherein the communication protocol comprises a handshake protocol; and perform the handshake protocol with the on-road vehicle via the secure communication interface.

5. The entertainment system of claim 1, wherein the at least one processor is further configured to receive the make and model information of the on-road vehicle from the on-road vehicle.

6. The entertainment system of claim 1, wherein the at least one processor is further configured to receive a VIN number of the on-road vehicle from the on-road vehicle.

7. The entertainment system of claim 6, wherein the at least one processor is further configured to determine the characteristics of the on-road vehicle based on the VIN number.

8. The entertainment system of claim 1, wherein the content output system is further configured to:

determine one or more interior features of the on-road vehicle associated with the generated content; and activate at least one of the one or more interior features of the on-road vehicle to represent features of the generated content.

9. The entertainment system of claim 8, wherein the at least one of the one or more interior features of the on-road vehicle are activated for at least one of the one or more occupants of the on-road vehicle.

10. The entertainment system of claim 8, wherein the at least one of the one or more interior features of the on-road vehicle comprise a display of the on-road vehicle, a climate control system of the on-road vehicle, or a lighting system of the on-road vehicle.

11. The entertainment system of claim 8, wherein the at least one of the one or more features of the on-road vehicle are activated at a same time as the generated content is presented to the one or more occupants of the on-road vehicle.

12. The entertainment system of claim 1, wherein the at least one processor is further configured to communicate with a transponder of the on-road vehicle, wherein the transponder communicates the make and model of the on-road vehicle.

13. The entertainment system of claim 1, wherein the at least one processor is further configured to communicate with a mobile device of one of the one or more occupants of the on-road vehicle, wherein the mobile device stores information indicating the make and model of the on-road vehicle.

14. The entertainment system of claim 1, wherein the at least one processor is further coupled to a visual system, wherein the visual system is configured to scan a barcode of the on-road vehicle, wherein the barcode comprises information indicating the make and model of the on-road vehicle.

15. A method comprising:

identifying a make and model of an on-road vehicle;

receiving the on-road vehicle at an entertainment track;

guiding the on-road vehicle along the entertainment track, wherein the on-road vehicle is guided autonomously;

generating content based on characteristics of the on-road vehicle, wherein the characteristics of the on-road vehicle are determined based on the identified make and model of the on-road vehicle;

generating guidance information for the on-road vehicle, wherein the guidance information is configured to synchronize movement of the on-road vehicle with the content; and presenting the content to one or more occupants of the on-road vehicle.

16. The method of claim 15, wherein the one or more characteristics of the on-road vehicle comprise one or more of a size parameter of the on-road vehicle, an interior feature of the on-road vehicle, an exterior feature of the on-road vehicle, an entertainment system of the on-road vehicle, a number of displays of the on-road vehicle, an audio system of the on-road vehicle, or a number of occupants of the on-road vehicle.

17. The method of claim 15, further comprising communicating with the on-road vehicle via a communication protocol.

18. The method of claim 17, further comprising:

generating a secure communication interface with the on-road vehicle, wherein the communication protocol comprises a handshake protocol; and performing the handshake protocol with the on-road vehicle via the secure communication interface.

19. The method of claim 15, further comprising receiving the make and model of the on-road vehicle from the on-road vehicle.

20. The method of claim 15, further comprising receiving a VIN number of the on-road vehicle from the on-road vehicle.

21. The method of claim 20, further comprising determining the characteristics of the on-road vehicle based on the VIN number.

22. The method of claim 15, further comprising:

determining one or more interior features of the on-road vehicle associated with the generated content; and activating at least one of the one or more interior features of the on-road vehicle to represent features of the generated content.

23. The method of claim 22, wherein the at least one of the one or more interior features of the on-road vehicle are activated for at least one of the one or more occupants of the on-road vehicle.

24. The method of claim 22, wherein the at least one of the one or more interior features of the on-road vehicle comprise a display of the on-road vehicle, a climate control system of the on-road vehicle, or a lighting system of the on-road vehicle.

25. The method of claim 22, wherein the at least one of the one or more interior features of the on-road vehicle are activated at a same time as the generated content is presented to the one or more occupants of the on-road vehicle.

26. The method of claim 15, further comprising communicating with a transponder of the on-road vehicle, wherein the transponder communicates the make and model of the on-road vehicle.

27. The method of claim 15, further comprising communicating with a mobile device of one of the one or more occupants of the on-road vehicle, wherein the mobile device stores information indicating the make and model of the on-road vehicle.

28. The method of claim 15, further comprising scanning a barcode of the on-road vehicle, wherein the barcode comprises information indicating the make and model of the on-road vehicle.

* * * * *